US006870499B2

United States Patent
Burns

(10) Patent No.: US 6,870,499 B2
(45) Date of Patent: Mar. 22, 2005

(54) SYSTEM AND METHOD FOR INCREASING RESISTANCE TO TARGET VIBRATIONS IN SYNTHETIC APERTURE RADAR SIGNALS

(75) Inventor: Richard H. Burns, Toluca Lake, CA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 10/448,875

(22) Filed: May 30, 2003

(65) Prior Publication Data

US 2004/0239548 A1 Dec. 2, 2004

(51) Int. Cl.[7] .............................. G01S 13/00; G01C 3/08
(52) U.S. Cl. ........................ 342/25; 342/159; 356/4.01
(58) Field of Search .......................... 342/179, 25, 159, 342/160, 189; 356/3.01, 5.15

(56) References Cited

U.S. PATENT DOCUMENTS

| | | | | |
|---|---|---|---|---|
| 3,790,939 A | * | 2/1974 | Constant | 342/25 |
| 4,320,397 A | * | 3/1982 | Frosch et al. | 342/82 |
| 4,617,567 A | * | 10/1986 | Chan | 342/25 |
| 4,929,951 A | * | 5/1990 | Small | 342/179 |
| 5,079,555 A | * | 1/1992 | Turpin | 342/25 |
| 5,160,932 A | | 11/1992 | Bull | |
| 5,469,167 A | * | 11/1995 | Polge et al. | 342/25 |
| 5,566,382 A | * | 10/1996 | Worchesky et al. | 359/237 |
| 5,608,404 A | * | 3/1997 | Burns et al. | 342/25 |
| 5,886,662 A | * | 3/1999 | Johnson | 342/25 |
| 5,900,833 A | * | 5/1999 | Sunlin et al. | 342/22 |
| 6,232,913 B1 | * | 5/2001 | Lehtinen | 342/137 |
| 6,559,932 B1 | * | 5/2003 | Halmos | 356/5.03 |
| 6,597,304 B2 | * | 7/2003 | Fienup | 342/25 |

\* cited by examiner

*Primary Examiner*—Bernarr E. Gregory
*Assistant Examiner*—Brian Andrea
(74) *Attorney, Agent, or Firm*—Alston & Bird LLP

(57) ABSTRACT

A synthetic aperture radar (SAR) system includes a transmitter capable of transmitting a pair of signals that each have a predetermined frequency in the optical band of the electromagnetic spectrum. The predetermined frequency can be selected, for example, to provide a level of resistance to at least one of movement of the target, target vibration and optical path length variations, and can further be selected based upon a predefined range and azimuth resolution. The SAR system also includes a receiver capable of receiving at least a portion of the pair of signals that has been reflected off of a target. In this regard, the receiver is capable of processing the reflected portion of the pair of signals based upon a difference frequency between the transmitted pair of signals.

24 Claims, 4 Drawing Sheets

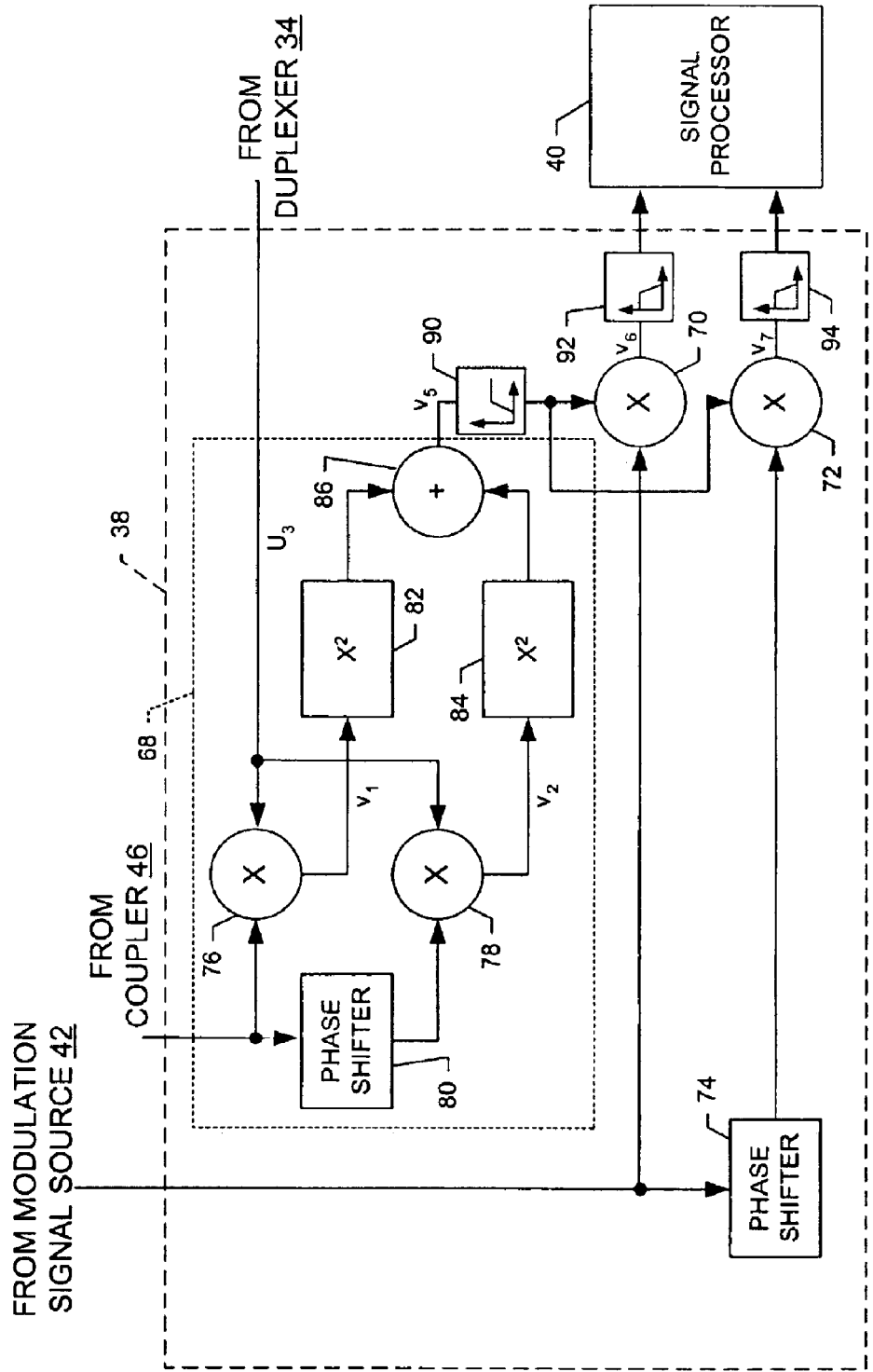

SYSTEM AND METHOD FOR INCREASING RESISTANCE TO TARGET VIBRATIONS IN SYNTHETIC APERTURE RADAR SIGNALS

FIELD OF THE INVENTION

The present invention relates generally to synthetic aperture radar (SAR) systems and, more particularly, relates to systems and methods for increasing resistance to target vibrations in SAR systems utilizing source signals having a frequency in the optical band of the electromagnetic spectrum.

BACKGROUND OF THE INVENTION

There has been a continuing effort to develop radar systems which are suitable for high-resolution applications, such as ground-mapping and air reconnaissance. Initially, this finer resolution was achieved by the application of pulse-compression techniques to conventional radar systems which were designed to achieve range resolution by the radiation of a short pulse, and angular, or azimuthal, resolution by the radiation of a narrow beam. The pulse-compression techniques provided significant improvement in the range resolution of the conventional radar systems, but fine angular resolution by the radiation of a narrow beam still required a large-diameter telescope which was impractical to transport with any significant degree of mobility. Subsequent to the development of pulse-compression techniques, synthetic aperture radar (SAR) techniques were developed for improving the angular resolution of a radar system to be significantly finer than that directly achievable with a radiated beam width from a conventional telescope of comparable diameter.

In prior techniques, an equivalent to a large-diameter telescope was established which was comprised of a physically long array of telescopes, each having a relatively small diameter. In the case of a long telescope array, a number of radiating elements were positioned at sampling points along a straight line and transmission signals were simultaneously fed to each element of the array. The elements were interconnected such that simultaneously received signals were vectorially added to exploit the interference between the signals received by the various elements to provide an effective radiation pattern which was equivalent to the radiation pattern of a single element multiplied by an array factor. That is, the product of a single element radiation pattern and the array factor resulted in an effective telescope pattern having significantly sharper telescope pattern lobes than the telescope pattern of the single element.

SAR systems are based upon the synthesis of an effectively long telescope array by signal processing means rather than by the use of a physically long telescope array. With an SAR, it is possible to generate a synthetic telescope many times longer than any physically large telescope that could be conveniently transported. As a result, for a telescope of given physical dimensions, the SAR will have an effective telescope beam width that is many times narrower than the beam width which is attainable with a conventional radar. In most SAR applications, a single radiating element is translated along a trajectory, to take up sequential sampling positions. At each of these sampling points, a signal is transmitted and the amplitude and the phase of the radar signals received in response to that transmission are stored. After the radiating element has traversed a distance substantially equivalent to the length of the synthetic array, the signals in storage are somewhat similar to the signals that would have been received by the elements of an actual linear array telescope.

An SAR can obtain a resolution similar to a conventional linear array of equivalent length as a consequence of the coherent transmission from the sampling points of the SAR. The stored SAR signals are subjected to an operation which corresponds to that used in forming the effective telescope pattern of a physical linear array. That is, the signals are added vectorially, so that the resulting output of the SAR is substantially the same as could be achieved with the use of a physically long, linear telescope array. Briefly, and referring now to FIG. 1, an SAR system carried by an aircraft 10 maps a target region 12 by transmitting and receiving radar signals at various sampling points $S_1, \ldots, S_N$, along the flight path 14 of the aircraft. In this regard, the SAR system may be positioned in the nose portion 15 of the aircraft.

Many conventional SAR systems operate at wavelengths in the microwave band of the electromagnetic spectrum. More particularly, many conventional SAR systems operate at wavelengths between 0.8 and 100 cm. Generally, the highest resolution SAR systems operate at the shortest wavelengths, while those SAR systems operating at longer wavelengths have a somewhat lower resolution, but are less affected by errors introduced into the system, such as from vibrations in the aircraft, any element within the target field, and/or random density variation of the intervening atmosphere.

Another drawback of conventional SAR systems is that target objects in the return images of such systems, which are generated at microwave frequencies, appear much different than they do when illuminated with visible light. In this regard, such target objects may, in various instances, only be recognized by a specially trained analyst. As such, to further improve the recognizability and/or the resolution of the return images of SAR systems, and/or the radiometric efficiency of SAR systems, SAR systems are under development that operate at wavelengths in the optical band of the electromagnetic spectrum. That is, SAR systems are under development that operate at wavelengths between 0.4 micron and 10 micron. Whereas such systems may have improved resolution and/or radiometric efficiency, such systems have drawbacks. In this regard, such SAR systems are prone to errors due to the extreme sensitivity of such SAR systems to errors introduced into the system, such as from those sources described above. For example, movement of a reflective element in the target field by as little as a micron can obscure everything in a range bin of the target field (shown in FIG. 1 as $R_1, \ldots, R_M$).

SUMMARY OF THE INVENTION

In light of the foregoing background, the present invention provides an improved system and method for increasing resistance to target vibrations in synthetic aperture radar (SAR) signals. The system and method of embodiments of the present invention are capable of operating at wavelengths in the optical band of the electromagnetic spectrum while overcoming the drawbacks of prior techniques. In this regard, the system and method of embodiments of the present invention are capable of transmitting a pair of signals having frequencies in the optical band of the electromagnetic spectrum. Portions of the transmitted pair of signals can then reflect off of a target and return to the system, where the reflected portions can be preprocessed by measuring the phase of the reflected portions in fractions of the difference in wavelength between the transmitted signals. The reflected signals can then be processed based upon the difference in wavelength to thereby locate the target.

According to one aspect of the present invention, a synthetic aperture radar (SAR) system is provided. The SAR system includes a transmitter capable of transmitting a pair of signals that each have a predetermined frequency in the optical band of the electromagnetic spectrum. The predetermined frequency can be selected in a number of different manners. For example, the predetermined frequency of the pair of signals can be selected to provide a level of resistance to at least one of movement of the target, target vibration and optical path length variations. Also, for example, the predetermined frequency can be selected further based upon a predefined range and azimuth resolution.

The SAR system also includes a receiver capable of receiving at least a portion of the pair of signals that has been reflected off of a target. In this regard, the receiver is capable of processing the reflected portion of the pair of signals based upon a difference frequency between the transmitted pair of signals. The receiver can be capable of high pass filtering baseband cross terms and/or low pass filtering other cross terms from the portion of the pair of signals that has reflected off of a plurality of scatterers.

More particularly, the transmitter can be capable of emitting a signal having a frequency in the optical band of the electromagnetic spectrum. The emitted signal can then be mixed with an oscillator signal, such as by using a balanced mixer, to produce the pair of signals that are transmitted. Upon receipt of the reflected portion, then, the receiver can be capable of processing the reflected portion of the pair of signals into signals independent of the frequency of the emitted signal.

According to another aspect of the present invention, a method is provided for locating a target. The method includes transmitting a pair of signals that each have a predetermined frequency in the optical band of the electromagnetic spectrum. Thereafter, at least a portion of the pair of signals that has been reflected off of the target is received. The reflected portion of the pair of signals is then preprocessed to establish a synthetic aperture output representative of outputs produced over a synthetic telescope aperture. Next, the synthetic aperture output is further processed to thereby locate the target. Additionally, according to another aspect of the present invention, a transmitter and receiver configured to operate in a synthetic aperture radar system are provided.

BRIEF DESCRIPTION OF THE DRAWINGS

Figure 1:
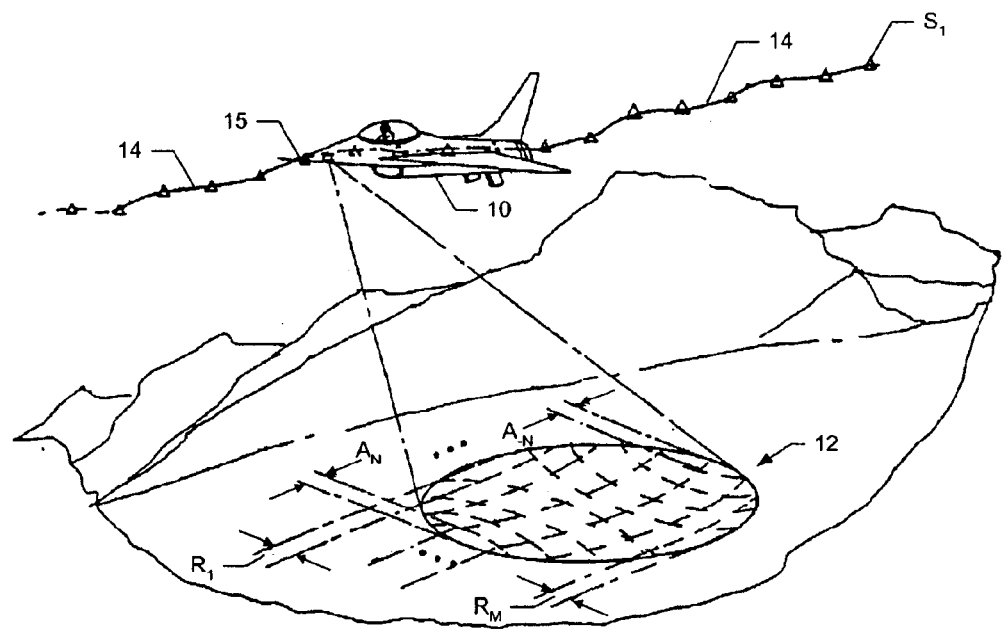
Figure 2:
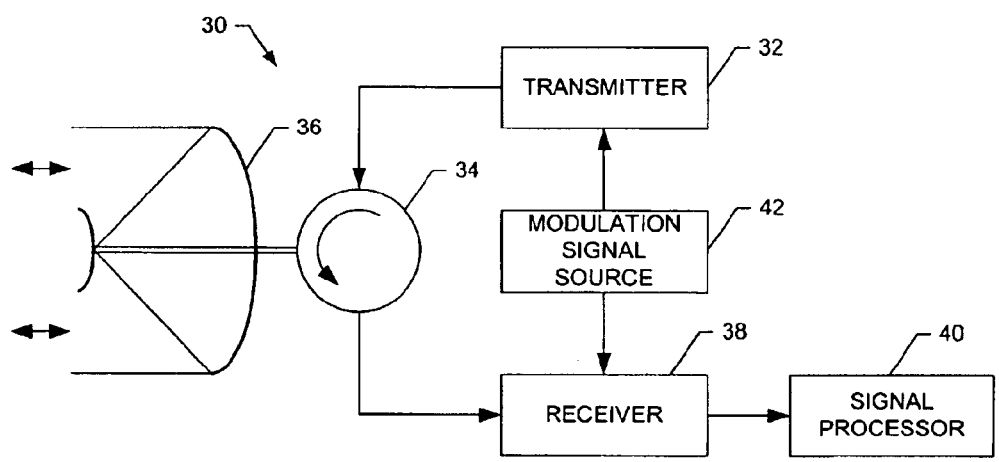
Figure 3:
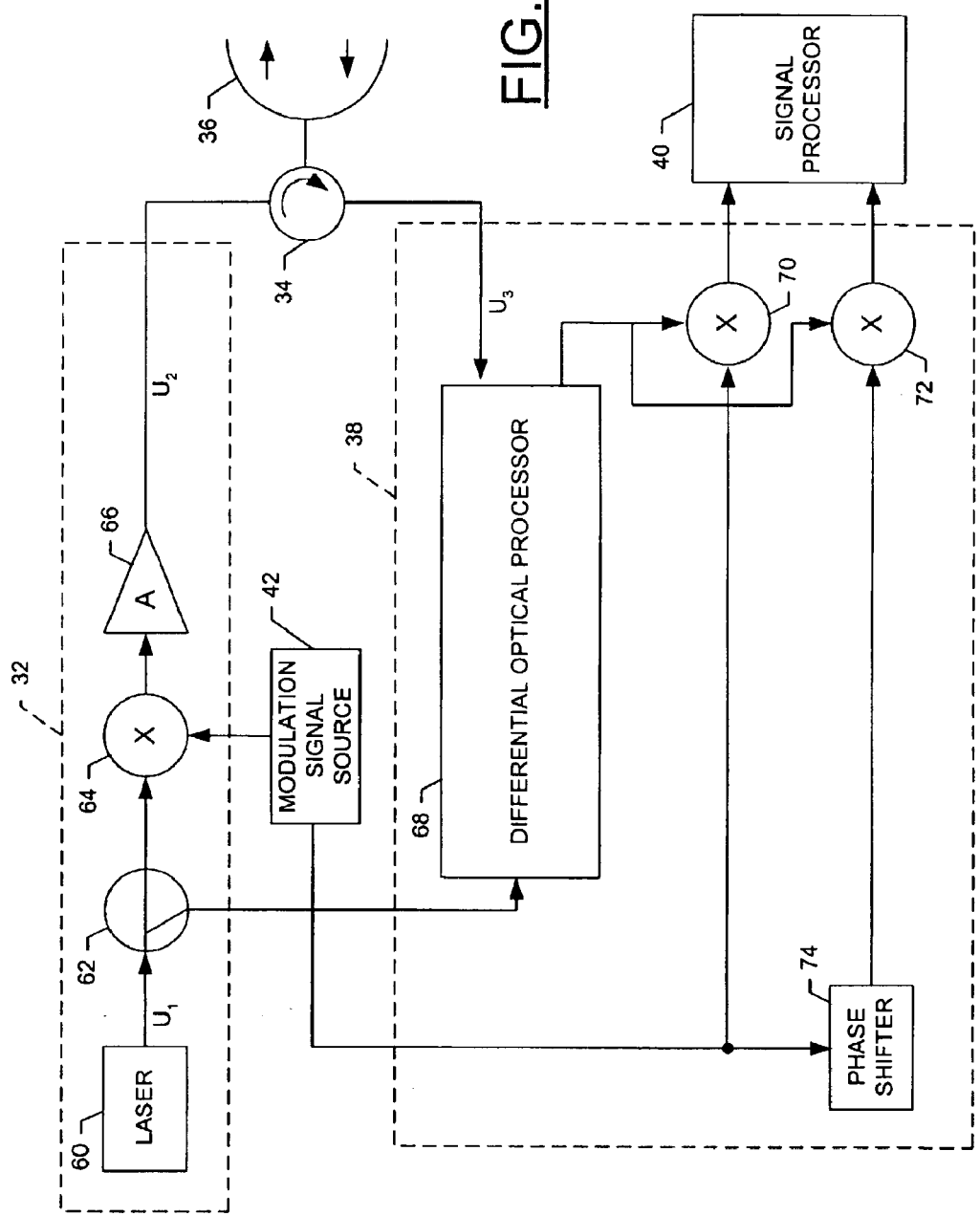
Figure 4:
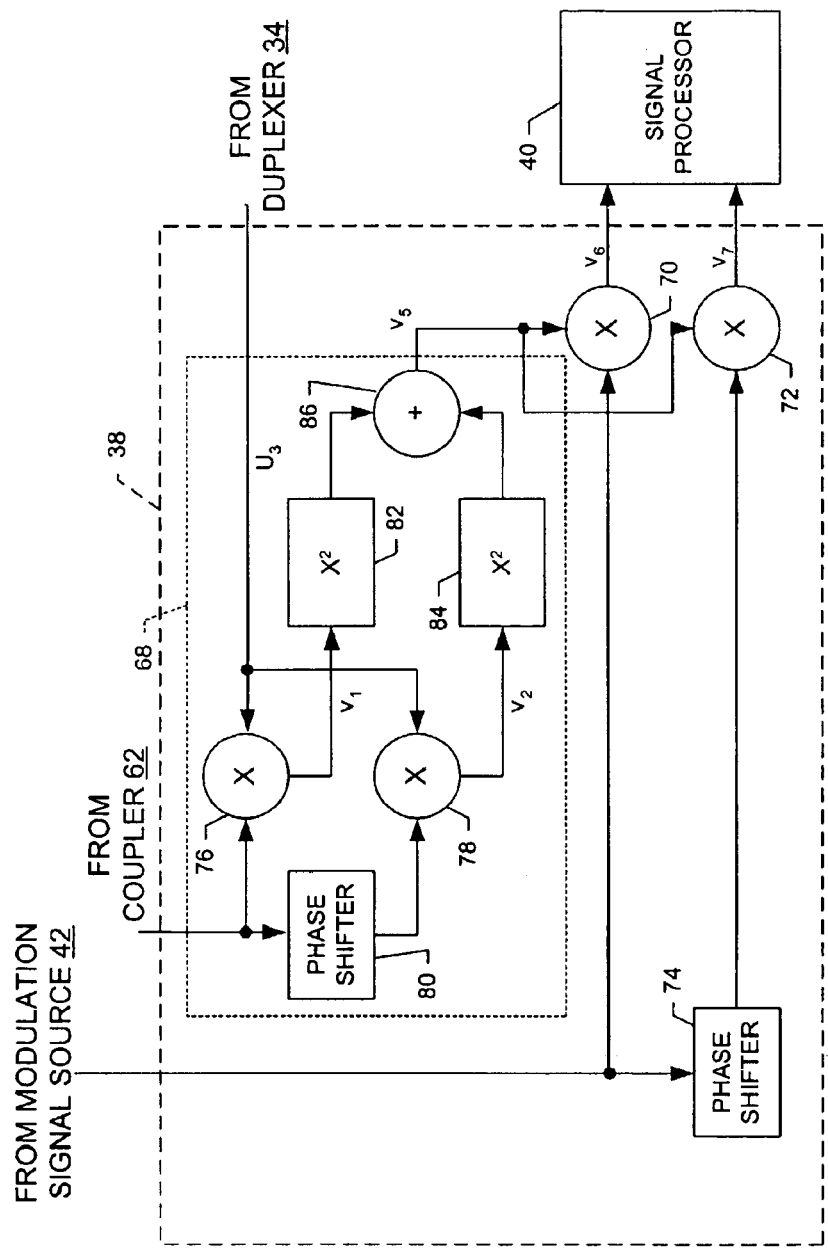

Having thus described the invention in general terms, reference will now be made to the accompanying drawings, which are not necessarily drawn to scale, and wherein:

FIG. 1 is a pictorial view of an aircraft following a defined flight path and mapping terrain with a synthetic aperture radar (SAR) system according to one embodiment of the present invention;

FIG. 2 is a schematic block diagram of an SAR system according to one embodiment of the present invention;

FIG. 3 is a schematic block diagram of an SAR system according to one embodiment of the present invention highlighting the transmitter and receiver;

FIG. 4 is a schematic block diagram an SAR system according to one embodiment of the present invention highlighting a differential optical processor according to one embodiment of the present invention; and FIG. 5 is a schematic block diagram an SAR system according to another embodiment of the present invention highlighting a differential optical processor according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 2, a synthetic aperture radar (SAR) system according to one embodiment of the present invention is indicated generally by reference numeral 30. As shown and described, the SAR system operates in a continuous wave mode. It should be understood, however, that the SAR system can be configured to operate in a pulsed, or chirped, mode without departing from the spirit and scope of the present invention. To briefly describe the SAR system, a pair of radar signals each having a certain frequency is generated by a transmitter 32. As well known to those skilled in the art, conventional SAR systems transmit radar signals having a wavelength in the microwave band of the electromagnetic spectrum, between 0.8 cm and 100 cm. To improve the resolution and radiometric efficiency of the SAR system of embodiments of the present invention, the pair of radar signals generated by the transmitter each have a wavelength in the optical band of the electromagnetic spectrum, between 0.4 microns and 14 microns. In other terms, the pair of radar signals each have a frequency between $2 \times 10^{13}$ Hz and $8 \times 10^{14}$ Hz (frequency=speed of light/wavelength).

The frequencies of the pair of radar signals can be selected in any of a number of different manners. In one advantageous embodiment, the frequencies are selected to be closely spaced from one another such that the difference between the two frequencies is small. More particularly, then, the frequencies can be selected such that the difference between the frequencies is thereby selected to provide a level of resistance to target movement, vibration or the like. In this regard, the frequencies can be selected such that the associated difference wavelength is longer than system vibrations and/or optical path length variations due to air turbulence or the like. As will be appreciated, however, the greater the resistance of the SAR system to target movement, the lower the resolution of the system. Thus, while the frequencies are selected such that the frequency difference provides a level of resistance to target movement, the level of resistance desired can be selected based upon a predefined, desired range and azimuth resolution of the SAR system.

Once generated in the transmitter 32, the pair of signals are sent to a duplexer 34 where the signals are passed through to a telescope 36, beam director or the like. The signals are then transmitted from the telescope to a particular target region such as an area of terrain 12 (see FIG. 1). A portion of the signals are reflected off the target back to the telescope. The received signals are transmitted back to the duplexer, which forwards the received signals to a receiver 38, where the signals received by the receive are analog signals. Once within the receiver, the received signals are preprocessed and thereafter passed to a signal processor 40.

During preprocessing, as described more fully below, the receiver 38 measures the phase of the reflected signals in fractions of the difference frequency between the signals transmitted by the transmitter 32. The reflected signals can then be further preprocessed in the receiver, and thereafter mixed with reference signals from a modulation signal source 42, as described below. In brief, the SAR 30 may include a modulation signal source that is provided for correlating the phase relationship between the signals that are generated by the transmitter and the reflected signals that are preprocessed by the receiver. This results in signals each consisting of a sequence of digital samples, where each sample is represented by a complex number. Thereafter, the digital signals are passed to the signal processor 40. The signal processor can then operate in any of a number of different manners known to those skilled in the art to integrate the reflected signals with other received signals over time into range lines $R_1, \ldots, R_M$ 16 (shown in FIG. 1), where each range line includes a plurality of azimuth positions $A_{-N}, \ldots, A_N$. The range lines can, in turn, be used to generate an image of the target region 12.

Operation of the system 30 will now be more particularly described in accordance with embodiments of the present invention. In this regard, reference is now drawn to FIG. 3, which further illustrates the transmitter 32, modulation signal source 42 and receiver 38 of one embodiment of the present invention. The transmitter includes a signal source, a coupler 62, a mixer 64 and an amplifier 66. The various elements of the transmitter can comprise any of a number of elements, as such are well known to those skilled in the art. For example, the signal source can comprise any of a number of signal sources capable of generating a signal in accordance with an SAR system. In one embodiment, the signal source comprises a laser source 60 that emits an oscillating laser signal with a frequency υ in the optical band of the electromagnetic spectrum, such as a frequency $υ=10^{14}$ Hz. The laser source therefore, can emit a laser signal $U_1=\cos(υt)$.

From the laser source 60, the signal propagates through the coupler 62, which has a coupling L, which is generally defined as the fraction of the input power that is coupled to one of the output ports. The coupler separates the signal into two parts, one part of which subsequently enters the mixer 64, which can comprise an optical balanced mixer. The other part of the signal, which can be represented as $L\times\cos(υt)$, subsequently enters the receiver 38, as described more fully below.

As indicated above, to improve the resolution and radiometric efficiency of the SAR system 30, the transmitter 32 generates a pair of radar signals each having a wavelength in the optical band of the electromagnetic spectrum. More particularly, the transmitter generates radar signals that have a frequency difference of $(2\times\omega)$, where the frequency difference is selected as described above. In this regard, the modulation signal source 42 is capable of generating an oscillating signal, which can be represented as $\cos(\omega t)$. Although not shown, the oscillating signal from the modulation signal source can be modulated by a pulse waveform. Additionally, or alternatively, the oscillating signal may be chirped. As the oscillating signal propagates through the mixer 64, then, the signal can be mixed with the oscillator signal into a pair of signals. The output from the mixer, having gain M, can subsequently pass through the amplifier 66, which amplifies the output by a factor A. The amplified signals can then be represented as $U_2=MA[\cos(υ+\omega)t+\cos(υ-\omega)t]$. In other terms, the amplified signals can be represented as $U_{2a}=MA\times\cos(υ+\omega)$ and $U_{2b}=MA\times\cos(υ-\omega)t$.

Once generated in the transmitter 32, the pair of signals are sent to the duplexer 34 where the signals are passed through to the telescope 36. The signals are then transmitted from the telescope to a particular target region such as an area of terrain 12. A portion of the signals are then reflected off the target back to the telescope with an amplitude reflectance, R, where a Doppler shift of δ is imparted on the signals, and the delay between the time the signals are transmitted and received, i.e., the T/R delay, is τ. The received signals are transmitted back to the duplexer, which forwards the received signals to the receiver 38. In this regard, the received signals from each scatterer in the target region can be represented as $$U_3 = \frac{MAR}{2}[\cos(υ+\delta+\omega)(t-\tau) + \cos(υ+\delta-\omega)(t-\tau)].$$

In other terms, the received signals can be represented as $$U_{3a} = \frac{MAR}{2}\cos(υ+\delta+\omega)(t-\tau)$$

and $$U_{3b} = \frac{MAR}{2}\cos(υ+\delta-\omega)(t-\tau).$$

Once within the receiver 38, the received signals propagate to a differential optical processor 68. As shown above, the received signals $U_{3a}$ and $U_{3b}$ are both functions of the optical frequency of the laser signal emitted from the laser source 60 in the transmitter 32. As such, to facilitate subsequent processing of the received signals, the differential optical processor is capable of processing the received signals into signals that are no longer functions of the optical frequency of the laser signal. In other terms, the differential optical processor is capable of processing the received signals into signals independent of the optical frequency of the laser signal.

After the differential optical processor 68, the received signals can be further processed, such as in a manner consistent with a conventional SAR system, but with a sensitivity to vibration and atmospheric piston of a conventional SAR system operating at a frequency of two times the frequency difference $(2\times\omega)$ of the signals generated in the transmitter 32, as described below. More particularly, the signals processed by the differential optical processor can propagate to a pair of mixers 70 and 72, such as radio frequency (RF) mixers. Mixer 70 also receives the signal from the modulation signal source 42 (e.g., $\cos(\omega t)$). The other mixer, mixer 72, receives a signal from the modulation signal source that has been phase shifted by phase shifter 74. The phase shifter can shift the phase of the modulation signal source signal by any number of different amounts but, in one particularly advantageous embodiment, the phase shifter shifts the phase of the modulation signal source signal by ninety degrees such that when the signal from the modulation signal source is represented as $\cos(\omega t)$, the phase shifted signal can be represented as $\sin(\omega t)$.

After being mixed with the modulation signal source signal and the phase shifted oscillator signal in mixers 70 and 72, respectively, the mixed signals can thereafter propagate to the signal processor 40. Thereafter, the signals can be processed, such as in a manner consistent with conventional SAR systems.

Reference will now be drawn to FIG. 4, which more particularly illustrates a differential optical processor 68 according to one embodiment of the present invention. As explained above, once within the receiver 38, the received signals propagate to the differential optical processor 68. As shown in more detail in FIG. 4, then, the received signals propagate to an in-phase detector 76 and a quadrature detector 78. In addition to the received signals, the in-phase detector also receives part of the signal from the coupler 62 in the transmitter 32, where the signal received by the in-phase detector can be represented as L×cos(υt). The quadrature detector, on the other hand, can receive the same part of the signal from the coupler, after the signal has been passed through a phase shifter 80. The phase shifter, as well known to those skilled in the art, is capable of imparting a phase shift on the signal passed therethrough. In one advantageous embodiment, the phase shifter imparts a ninety-degree phase shift on the signal from the coupler such that the signal received by the quadrature detector can be represented as L×sin(υt).

Within the in-phase detector 76 and the quadrature detector 78, the received signals are mixed with the respective signals from the coupler into $v_1$ and $v_2$, respectively. In this regard, $v_1$ and $v_2$ can be represented as follows:

$$v_1 = \frac{MARL}{4}[\cos((\delta+\omega)t + (\upsilon+\omega)\tau) + \cos((\delta-\omega)t + (\upsilon-\omega)\tau)]$$

$$v_2 = \frac{MARL}{4}[\cos((\delta+\omega)t - (\upsilon+\omega)\tau + \pi) + \cos((\delta-\omega)t + (\upsilon-\omega)\tau + \pi)]$$

As will-be appreciated, in embodiments in which the laser source 60 comprises a laser source such that the signals are laser signals, the signals received in the receiver 38 will likewise comprise laser signals. In the in-phase and quadrature detectors, then, the signals are converted into electrical signals so that the remainder of the system 30 can subsequently process the electrical signals $v_1$ and $v_2$.

After the in-phase detector 76 and quadrature detector 78 generate electrical signals $v_1$ and $v_2$, respectively, signals $v_1$ and $v_2$ each propagate to a squaring element 82 and 84. The squaring elements, in turn, square the signals $v_1$ and $v_2$, after which the squared signals $v_1^2$ and $v_2^2$ propagate to a summing element 86. The summing element sums the squares of the signals $v_1$ and $v_2$ into signal $v_5$. In this regard, signal $v_5$ can be represented as $$v_5 = v_1^2 + v_2^2 = \left(\frac{MARL}{8}\right)^2 \times [1 + \cos(2\omega t - 2\omega\tau)].$$

As indicated above, after the differential optical processor 68 processes the received signals, or more particularly, after the summing elements sums the squares of the signals $v_1$ and $v_2$ into signal $v_5$, signal $v_5$ can propagate to mixers 70 and 72. In one embodiment, mixer 70 also receives the signal from the modulation signal source 42 (e.g., cos(ωt)), and mixer 72 receives the phase-shifted oscillator signal (e.g., sin(ωt)). Signal $v_5$ can then be mixed with the oscillator signal and phase-shifted oscillator signal, respectively, into a pair of signals $v_6$ and $v_7$. In one embodiment, for example, signal $v_5$ is mixed with oscillator signal cos(ωt) and phase-shifted oscillator signal sin(ωt) into signals $v_6$ and $v_7$, respectively, which can be represented as follows:

$$v_6 = \left(\frac{MARL}{8}\right)^2 \times \cos(2\omega\tau)$$

$$v_7 = \left(\frac{MARL}{8}\right)^2 \times \sin(2\omega\tau)$$

Signals $v_6$ and $v_7$ therefore represent the real and imaginary parts, respectively, of the return signal of a conventional SAR system operating at a frequency of two times the frequency difference (2×ω) of the signals generated in the transmitter 32, after being shifted back to baseband. As such, signals $v_6$ and $v_7$ can be further processed, such as in a manner consistent with a conventional SAR system, but with a sensitivity to vibration and atmospheric piston of the conventional SAR system as opposed to the sensitivity to vibration and atmospheric piston of a SAR system operating in the optical frequency band. More particularly, for example, presume the maximum vibration permitted by the SAR system were 0.1 wave. In such an instance, the maximum vibration for a conventional SAR system operating at an optical frequency (e.g., 1 micron) would equate to 0.1 micron. In contrast, the maximum vibration for the SAR system 30 operating in accordance with embodiments of the present invention, with a difference frequency of 10 GHz, would equate to approximately 1 cm.

As will be appreciated by those skilled in the art, in various instances multiple scatterers can be present in the same range line. In such instances, signal $v_5$ can be determined to be a function of desired terms, as well as cross terms appearing in the baseband and at intermediate frequencies (IF). More particularly, in instances of multiple scatterers, signal $v_5$ can be represented as follows:

$$v_5 = \left(\frac{MAL}{8}\right)^2 \times [\text{Desired Terms} + \text{Baseband Cross Terms} + \text{IF Cross Terms}]$$

In the preceding, the Desired Terms, Baseband Cross Terms and IF Cross Terms can be represented as follows:

Desired Terms=$R_1^2[1+\cos(2\omega t-2\omega\tau_1)]+R_2^2[1+\cos(2\omega t-2\omega\tau_2)]$ Baseband Cross Terms=$R_1R_2\times\cos(\upsilon(\tau_1-\tau_2)+\omega(\tau_1-\tau_2))+R_1R_2\times\cos(\upsilon(\tau_1-\tau_2)-\omega(\tau_1-\tau_2))$ IF Cross Terms=$R_1R_2\times\cos(2\omega t+\upsilon(\tau_1-\tau_2)+\omega(\tau_1+\tau_2))+R_1R_2\times\cos(2\omega t-\upsilon(\tau_1-\tau_2)+\omega(\tau_1+\tau_2))$ With respect to the baseband cross terms, the frequency of the baseband terms can be determined to be functions of the rate of change of the range Z and the wavelength λ of the signal emitted from the laser source 60. In other terms, the frequency $f_{BB}$ of the baseband terms can be determined as follows:

$$f_{BB} = \upsilon \times (t_1 - t_2) \approx \frac{2\times(\dot{Z}_1 - \dot{Z}_2)}{\lambda}$$

where the single dot notation represents a "rate of change." In one typical example where the rate of change of the range due to changing aspect $\dot{Z}_1-\dot{Z}_2=1$ m/s and the wavelength λ=1 μm, the frequency of the baseband terms $f_{BB}$ run between 0 and 2 MHz, much lower than the IF frequency of $1\times10^9$ or $1\times10^{10}$ Hz. To reduce or remove the undesirable baseband cross terms, then, in one embodiment the receiver 38 includes a high pass filter 90, band pass filter or the like located between the summing element 86 and mixers 70 and 72, as shown in FIG. 5. By including the high pass filter, the undesirable baseband cross terms can be filtered out of signal $v_5$.

The intermediate frequency cross terms will be centered at the IF frequency (2×ω). Their spectrum will depend on system variables including the range, platform velocity, size of target area, and angular rate of target with respect to the sensor platform. For many system geometries, the cross terms will be spread over a much wider spectrum than the desired signal terms and may be reduced by low pass filtering the output signals $v_6$ and $v_7$, such as by low pass filters 92 and 94. In other geometries, the cross terms will be confined to a region about (2×ω) narrower than the signal. In such instances, the cross terms may be reduced or removed by high pass or band pass filtering signals $v_6$ and $v_7$.

By including both the high pass (or band pass) filter 90 and the low pass (or band pass filters) 92 and 94, then, both the undesirable baseband and intermediate frequency cross terms can be filtered out of the return signal in instances of multiple scatterers. The signal $v_5$ can therefore be represented as follows:

$$v_5 = \left(\frac{LAM}{8}\right)^2 \times R_1^2[1 + \cos(2\omega t - 2\omega\tau_1)] + R_2^2[1 + \cos(2\omega t - 2\omega\tau_2)]$$

where the Baseband Cross Terms and IF Cross Terms have been filtered out of signal $v_5$.

In either event of processing signals $v_5$, and/or $v_6$ and $v_7$, the resulting signals $v_6$ and $v_7$ can be processed by the signal processor 40, such as in a manner described above with respect to FIG. 3. The system 30, or more particularly the telescope 36, can be translated along a trajectory thereby taking up sequential sampling positions that can each be processed in accordance with embodiments of the present invention, with the processed data subsequently stored. After the telescope has traversed a distance substantially equivalent to the length of a synthetic array, the signals in storage are somewhat similar to the signals that would have been received by the elements of an actual linear array telescope. The stored signals can then be subjected to an operation which corresponds to that used in forming the effective telescope pattern of a physical linear array. That is, the signals are added vectorially, so that the resulting output of the system is substantially the same as could be achieved with the use of a physically long, linear telescope array.

Embodiments of the present invention therefore provide an improved system and method for increasing resistance to target vibrations in synthetic aperture radar (SAR) signals. The system and method of embodiments of the present invention are capable of operating at wavelengths in the optical band of the electromagnetic spectrum while overcoming the drawbacks of prior techniques. More particularly, the system and method of embodiments of the present invention are capable of transmitting a pair of signals having frequencies in the optical band of the electromagnetic spectrum. Portions of the transmitted pair of signals can then reflect off of a target and return to the system, where the reflected portions can be preprocessed by measuring the phase of the reflected portions in fractions of the difference in wavelength between the transmitted signals. The reflected signals can then be processed based upon the difference in wavelength to thereby locate the target.

Many modifications and other embodiments of the invention will come to mind to one skilled in the art to which this invention pertains having the benefit of the teachings presented in the foregoing descriptions and the associated drawings. For example, as indicated above, the optical frequencies transmitted from the transmitter 32 are typically selected such that the frequency difference provides a level of resistance to target movement, with the level of resistance desired being selected based upon a predefined, desired range and azimuth resolution of the SAR system 30. As such, in various embodiments, the frequency ω of the modulation signal source 42 can be made variable based upon a measured amount of target movement. The range and azimuth resolution of the system can therefore be made as high as possible, while maintaining a level of resistance at least as large as the measured amount of target movement.

Therefore It is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A synthetic aperture radar system comprising:
   a transmitter capable of transmitting a pair of signals that each have a predetermined frequency in the optical band of the electromagnetic spectrum; and
   a receiver capable of receiving at least a portion of the pair of signals that has been reflected off of a target, wherein the receiver is capable of processing the reflected portion of the pair of signals based upon a difference frequency between the transmitted pair of signals.

2. A synthetic aperture radar system according to claim 1, wherein the predetermined frequency of the pair of signals is selected to provide a level of resistance to at least one of movement of the target, target vibration and optical path length variations.

3. A synthetic aperture radar system according to claim 2, wherein the predetermined frequency of the pair of signals is selected further based upon a predefined range and azimuth resolution.

4. A synthetic aperture radar system according to claim 1, wherein the transmitter is capable of emitting a signal having a frequency in the optical band of the electromagnetic spectrum, wherein the emitted signal is capable of being mixed with an oscillator signal into the pair of signals, and wherein the receiver is capable of processing the reflected portion of the pair of signals into signals independent of the frequency of the emitted signal.

5. A synthetic aperture radar system according to claim 1, wherein the receiver is capable of high pass filtering baseband cross terms from the portion of the pair of signals that has reflected off of a plurality of scatterers.

6. A synthetic aperture radar system according to claim 1, wherein the receiver is capable of low pass filtering intermediate frequency cross terms from the portion of the pair of signals that has reflected off of a plurality of scatterers.

7. A receiver configured for operation in a synthetic aperture radar system, the receiver comprising:
   a differential optical processor capable of receiving at least a portion of a pair of signals that have each have been reflected off of a target, wherein the reflected portion of the pair of signals each have a predetermined frequency in the optical band of the electromagnetic spectrum, and wherein the differential optical processor is capable of processing the reflected portion of the pair of signals based upon a difference frequency between the transmitted pair of signals.

8. A receiver according to claim 7, wherein the predetermined frequency of the pair of signals is selected to provide a level of resistance to at least one of movement of the target, target vibration and optical path length variations.

9. A receiver according to claim 8, wherein the predetermined frequency of the pair of signals is selected further based upon a predefined range and azimuth resolution.

10. A receiver according to claim 7, wherein the differential optical processor is capable of receiving a pair of signals that have been reflected off of a target from a transmitter capable of emitting a signal having a frequency in the optical band of the electromagnetic spectrum such that the emitted signal is capable of being mixed with an oscillator signal into the pair of signals, and wherein the differential optical processor is capable of processing the reflected portion of the pair of signals into signals independent of the frequency of the emitted signal.

11. A receiver according to claim 7, wherein the differential optical processor is capable of high pass filtering baseband cross terms from the portion of the pair of signals that has reflected off of a plurality of scatterers.

12. A receiver according to claim 7 further comprising a pair of low pass filters capable of filtering intermediate frequency cross terms from the portion of the pair of signals that has reflected off of a plurality of scatterers.

13. A transmitter configured for operation in a synthetic aperture radar system, the transmitter comprising:
    a signal source capable of emitting a signal having a frequency in the optical band of the electromagnetic spectrum; and
    a mixer capable of mixing the emitted signal with an oscillator signal thereby resulting in a pair of signals that each have a predetermined frequency in the optical band of the electromagnetic spectrum,
    wherein the transmitter is capable of transmitting the pair of signals such that a receiver can receive at least a portion of the pair of signals that has been reflected off of a target, and thereafter process the reflected portion of the pair of signals based upon a difference frequency between the transmitted pair of signals.

14. A transmitter according to claim 13, wherein the predetermined frequency of the pair of signals is selected to provide a level of resistance to at least one of movement of the target, target vibration and optical path length variations.

15. A transmitter according to claim 14, wherein the predetermined frequency of the pair of signals is selected further based upon a predefined range and azimuth resolution.

16. A transmitter according to claim 13, wherein the transmitter is capable of transmitting the pair of signals such that a receiver can process the reflected portion of the pair of signals into signals independent of the frequency of the emitted signal.

17. A transmitter according to claim 16, wherein the transmitter is capable of transmitting the pair of signals such that, when the portion of the pair of signals reflect off of a plurality of scatterers, the receiver can further high pass filter baseband cross terms from the plurality of scatterers.

18. A transmitter according to claim 16, wherein the transmitter is capable of transmitting the pair of signals such that, when the portion of the pair of signals reflect off of a plurality of scatterers, the receiver can further low pass filter intermediate cross terms from the plurality of scatterers.

19. A method of locating a target comprising:
    transmitting a pair of signals that each have a predetermined frequency in the optical band of the electromagnetic spectrum;
    receiving at least a portion of the pair of signals that has been reflected off of the target;
    preprocessing the reflected portion of the pair of signals to establish a synthetic aperture output representative of outputs produced over a synthetic telescope aperture; and
    processing the synthetic aperture output to thereby locate the target.

20. A method according to claim 19, wherein transmitting a pair of signals comprises transmitting a pair of signals that each have a predetermined frequency selected to provide a level of resistance to at least one of movement of the target, target vibration and optical path length variations.

21. A method according to claim 20, wherein transmitting a pair of signals comprises transmitting a pair of signals that each have a predetermined frequency selected further based upon a predefined range and azimuth resolution.

22. A method according to claim 19, wherein transmitting a pair of signals comprises:
    emitting a signal having a frequency in the optical band of the electromagnetic spectrum; and
    mixing the emitted signal with an oscillator signal into the pair of signals,
    wherein preprocessing the reflected portion of the pair of signals includes preprocessing the reflected portion of the pair of signals into signals independent of the frequency of the emitted signal.

23. A method according to claim 19, wherein preprocessing the reflected portion of the pair of signals includes high pass filtering baseband cross terms from the portion of the pair of signals that has reflected off of a plurality of scatterers.

24. A method according to claim 19, wherein preprocessing the reflected portion of the pair of signals includes low pass filtering intermediate frequency cross terms from the portion of the pair of signals that has reflected off of a plurality of scatterers.

* * * * *